United States Patent
Enge et al.

[11] Patent Number: 6,058,963
[45] Date of Patent: May 9, 2000

[54] VEHICLE REFUELING VALVE

[75] Inventors: Trevor L. Enge, Novi, Mich.; Larry VanNatta, Mt. Morris; Manuel D. Rosas, Coleta, both of Ill.

[73] Assignee: Borg-Warner Automotive, Inc., Sterling Heights, Mich.

[21] Appl. No.: 08/922,772

[22] Filed: Sep. 3, 1997

Related U.S. Application Data

[63] Continuation-in-part of application No. 08/555,129, Nov. 8, 1995, Pat. No. 5,687,756.

[51] Int. Cl.$^7$ ................................................ F16K 24/04
[52] U.S. Cl. ............................................ 137/202; 137/43
[58] Field of Search ........................................ 137/43, 202

[56] References Cited

U.S. PATENT DOCUMENTS

| | | | |
|---|---|---|---|
| 4,781,218 | 11/1988 | Mori et al. | 137/202 |
| 5,044,397 | 9/1991 | Szlaga et al. | 137/202 X |
| 5,172,714 | 12/1992 | Kobayashi et al. | 137/202 X |
| 5,313,977 | 5/1994 | Bergsma et al. | 137/43 |
| 5,313,978 | 5/1994 | Takaiki et al. | 137/43 |
| 5,404,907 | 4/1995 | Benjey et al. | 137/43 X |
| 5,590,697 | 1/1997 | Benjey et al. | 137/202 X |
| 5,694,968 | 12/1997 | Devall et al. | 137/202 |
| 5,738,132 | 4/1998 | Zakai et al. | 137/43 |
| 5,749,347 | 5/1998 | Torii et al. | 137/43 X |
| 5,775,362 | 7/1998 | Sato et al. | 137/202 |

*Primary Examiner*—Gerald A. Michalsky
*Attorney, Agent, or Firm*—Reising, Ethington, Barnes et al.; Greg Dziegielewski

[57] ABSTRACT

A refueling valve for a motor vehicle includes a body connected to the upper wall of a fuel tank in vertical depending relationship. The body has a cover with a vapor exit passage adapted to be connected to a fuel vapor storage canister and a portion depending from the cover that has a vapor exit port that communicates with the fuel tank interior adjacent the upper wall of the fuel tank. A vent tube has one end connected to the vapor exit passage and an opposite end that communicates with the vent exit port and defines a valve seat. The vapor exit port is located with respect to the valve seat so as to separate liquid fuel particles from vapor flow during fuel fill. The valve seat is closed by a float valve when the fuel tank is full.

11 Claims, 4 Drawing Sheets

VEHICLE REFUELING VALVE

This is a continuation-in-part of U.S. patent application Ser. No. 08/555,129 filed Nov. 8, 1995, now U.S. Pat. No. 5,687,756, for a vehicle refueling valve.

TECHNICAL FIELD

This invention relates to a fuel vapor vent valve and more particularly to a fuel vapor vent valve for use with motor vehicle fuel tanks.

BACKGROUND OF THE INVENTION

In the typical fuel vapor vent valve for a motor vehicle fuel tank that is adapted to prevent spillage in case of shaking, tilting or rollover of the vehicle, the valve normally opens the fuel tank to an orifice that is connected by a vapor exit passage in the valve body to a vapor hose leading to a fuel vapor storage device. The valve body is commonly made as a one-piece plastic injected molded part that has a simple direct connection between the orifice and the vapor exit passage. However, this connection has a tendency to collect and pass any liquid fuel issuing from the orifice under pressure from the tank on to the vapor storage canister. The latter contains a fuel vapor absorber such as carbon and any liquid fuel delivered thereto will quickly reduce its vapor absorbing ability. An example of such vent valve is disclosed in U.S. Pat. No. 5,044,389 granted to David R. Gimby Sep. 3, 1991 for a high volume fuel vapor release valve and assigned to the assignee of the present invention.

It is difficult to configure the top of the molded body with a vapor exit passage connection that would somehow trap this liquid fuel after it passes through the orifice and then drain the trapped liquid fuel back to the tank. This is also the case where the valve is omitted and only venting is provided through an orifice in a vent body that mounts on the fuel tank.

As to any such possible liquid fuel drainage back to the tank in the case of a vent assembly having a valve that blocks the orifice on overfill, vehicle shaking, tilting and/or rollover, adversely affecting the operation of the valve for normal venting operation in an upright position and closure under these various circumstances must be considered. Any drainage path for liquid fuel trapped downstream of the orifice can not provide a path for fuel vapor to vent around the closed valve in the normal upright attitude of the tank or allow liquid fuel to escape from the tank when tipped or inverted.

One solution to such problem is set forth in U.S. Pat. No. 5,413,137 granted to David R. Gimby May 9, 1995 for a fuel vapor vent assembly with liquid trap; also assigned to the assignee of the present invention. The fuel vapor vent assembly set forth in the '137 patent embodies a fuel impervious insert that is adapted to be mounted in such a vent valve body and defines both a vertically oriented vent orifice and a liquid basin extending about the exit of this orifice. A simple cavity formed in the interior of the top of the plastic body cooperates with the basin in the insert to define an expansive chamber elevated above the orifice with a horizontal vapor exit passage in the plastic body adapted to be connected to a vapor storage device. The expansive chamber forms an elevated liquid trap at the exit of the orifice that traps liquid from the venting fuel vapor while permitting venting to continue therethrough and then drains the trapped liquid in the basin back into the tank through the orifice in the insert when the pressure in the fuel tank is relieved. The liquid trapping chamber has a ceiling directly opposite the orifice dead ending the vapor stream issuing therefrom and the vapor exit passage is connected to the expansive chamber at a point above the basin. These features combine to aid in separating any liquid fuel out from the vapor and down into the basin and prevent it from passing on to the vapor exit passage and thence to the vapor storage canister.

While suitable for their intended purpose, the fuel vapor vent assemblies set forth in the aforesaid prior art Gimby patents do not include provision for venting vapor from the tank as the float is closing at the same rate at which the fuel tank is being filled nor do they provide a predetermined vapor dome space within said tank to accommodate vapor pressure increases when the refueling valve is closed. Further, the unitary body arrangements are configured to locate the valve seat close to the tank top and the fuel vapor openings well below the valve seat so that venting is restricted as the float moves between its normally open position and its normally closed position. Moreover, the valve disclosed in the Gimby '389 patent has a direct path for liquid fuel to splash through the fuel vapor openings of the valve body into the vapor outlet past the valve seat.

It is therefore an object of the present invention to provide a fuel vapor vent device that vents vapor during fuel fill at the same rate as the rate of fuel flow into the tank while preventing liquid fuel flow to a fuel vapor storage canister.

A further object is to provide such a device that includes a vapor exit port providing vapor venting as a rollover float component moves toward closure as fuel flows through a filler neck of a fuel tank.

Another object is to provide a fuel vapor vent device for a motor vehicle fuel tank having a vapor exit passage with a flow area large enough to vent vapors at the same rate as the fuel tank is being filled so as to prevent pressure build up in the fuel tank during fuel fill.

Another object is to provide such an arrangement wherein the body of the fuel vapor vent device includes vapor exit ports within the tank that remain open as the fuel tank is filled and wherein the exit ports are large enough to vent vapors at the same rate at which the fuel tank is being filled and wherein the vapor exit ports are provided in the body at a point high enough with respect to the valve seat of a rollover valve to prevent liquid fuel carry over to a fuel vapor storage canister.

Yet another object is to provide a fuel vapor vent device that includes a vent tube defining a valve seat and a direct connection to a vapor exit passage in the top of the cover that is connected to a tube for connecting the fuel vapor vent device to the inlet of a charcoal canister wherein the area of the vent tube and the area of the vapor exit passage are substantially equal.

Still another object is to provide a fuel vapor vent device as set forth in the preceding objects including a refueling valve having a body with a vapor exit passage and a liquid inlet passage and the body being connected to the top of a fuel tank in depending relationship therewith; the valve including a float and a valving element carried by the float and tiltable with respect to the float for compensating for tilt and further characterized by the body further including a vapor exit port adjacent the top of the fuel tank and also including a vent tube with a valve seat located a substantial distance below the tank top and located at or below the level of the vapor exit port for preventing liquid fuel particles from entering the vapor exit passage.

Still another object is to provide a fuel vapor vent device including a refueling valve having a body with a vapor exit passage and a liquid inlet passage and the body being connected to the top of a fuel tank in depending relationship therewith; said valve including a float and a valving element carried by the float and tiltable with respect to the float for compensating for tilt and wherein said body further includes a vapor exit port located above said liquid inlet; a first vent tube supported within said body having one end sealingly connected to the vapor exit passage and having an opposite end defining a valve seat closable by the valving element and located at or below the vapor exit port for separating liquid fuel particles prior to entering said vapor exit passage and further characterized by a cover member connected to the upper wall of the fuel tank outboard thereof; the cover member forming the vapor exit passage and the body including a valve housing located inboard of said fuel tank and the vapor exit ports being formed in said valve housing adjacent the upper wall of the fuel tank.

Yet another object of the present invention is to provide a fuel vapor vent device of the preceding objects further characterized by said valving element having an annular skirt and a ball joint socket thereon located concentrically of said annular skirt; said float having a ball on one end thereof connected to the ball joint socket for providing freedom of movement between the float and the valving element for adjusting the position of said valving element with respect to said annular valve seat to compensate for tilt.

Another object of the present invention is to provide a fuel vapor vent device of the preceding objects wherein the refueling valve is further characterized by said float comprising a hollow cylindrical member with a closed end and an open end and a weighted closure disc on said open end for sealing the float; said weighted closure disc having a weight selected with respect to the displacement of said hollow cylindrical member for aligning said float vertically within said body for reducing friction between the hollow cylindrical member and said housing.

These and other objects, advantages and features of the present invention will become more apparent from the following description and accompanying drawings wherein:

DETAILED DESCRIPTION OF THE PREFERRED EMBODIMENT

Figure 1:
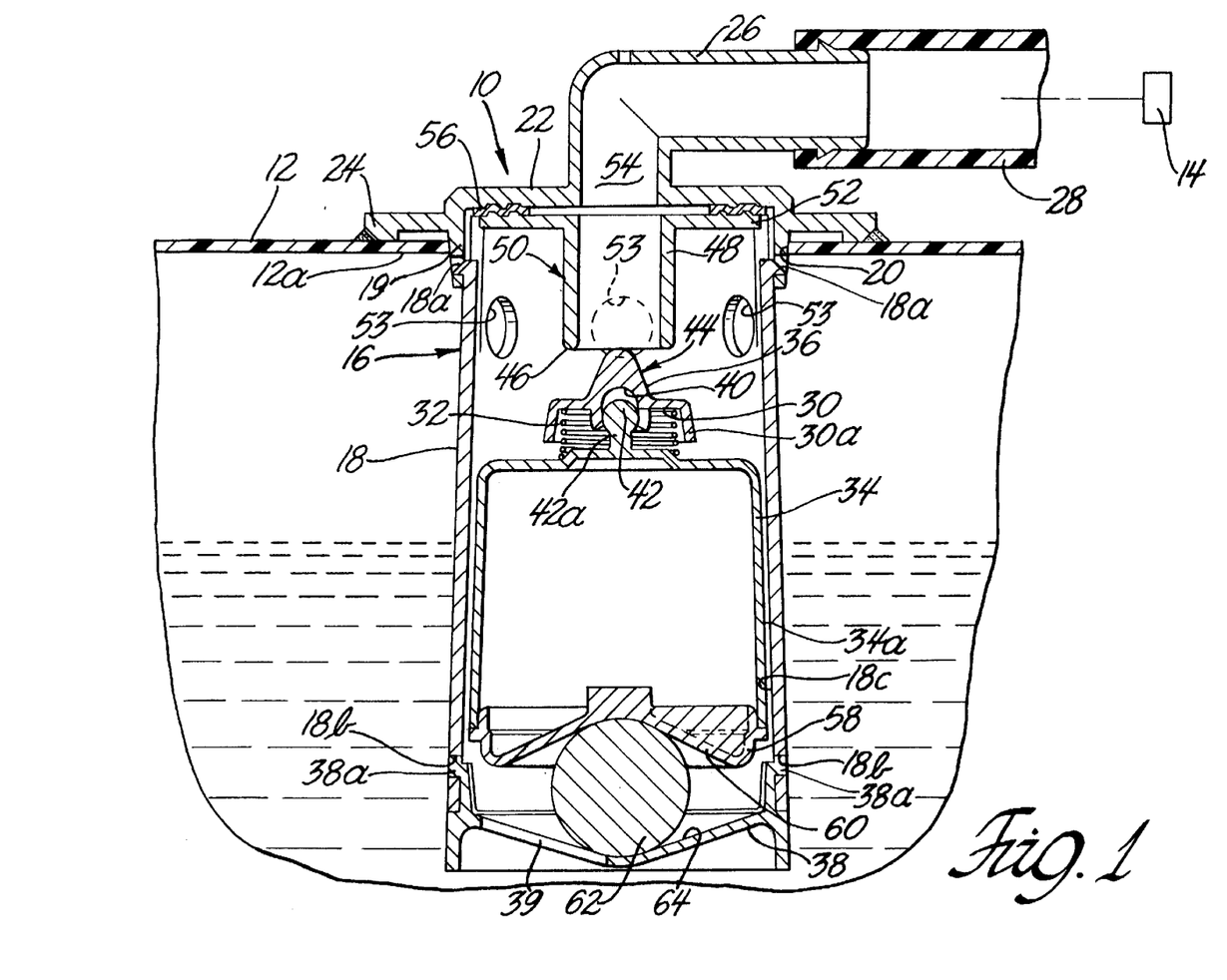
FIG. 1 is a sectional view of a motor vehicle fuel tank vapor vent valve assembly with a liquid fuel trap constructed in accordance with the present invention.
Figure 2:
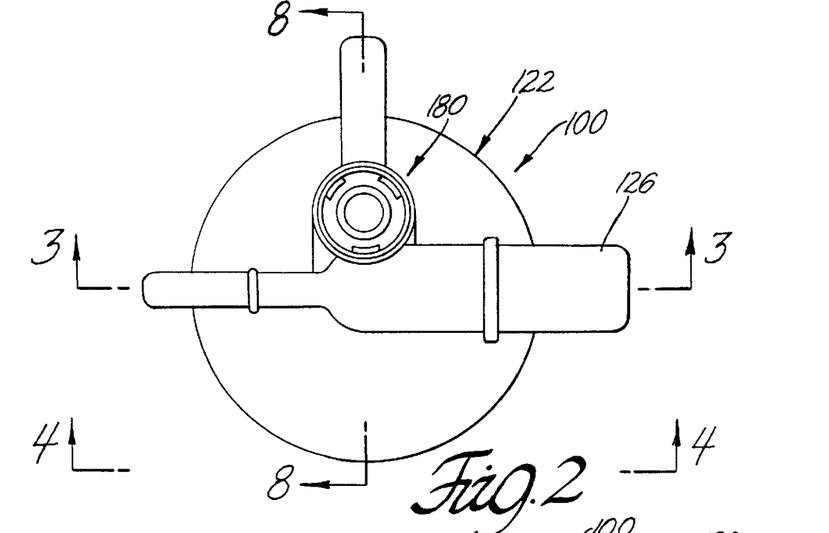
FIG. 2 is a top view of a vent valve assembly of a second preferred embodiment of the invention.

Referring to FIG. 1, there is illustrated a fuel vapor vent valve assembly for venting a motor vehicle fuel tank 12 to a fuel vapor storage canister 14 containing a fuel absorber such as carbon. The fuel tank 12 is made of high-density polyethylene (HDPE), as is the cover 22 and flange 24 of the valve assembly 10, this material being selected for its ability to be welded to fuel tanks.

The valve assembly 10 comprises body 16 that includes a generally cylindrical valve containing section 18 with tabs 18a thereon snap fit to a cylindrical extension 19 received in an opening 20 through the top wall of fuel tank 12. Cover 22 is also made of a high-density polyethylene (HDPE), this material being selected for its ability to weld to the fuel tank 12. Thus the flange 24 is welded about its perimeter to the tank to sealingly secure the fuel vapor vent valve assembly in place in a normal vertically oriented or upright position as shown in FIG. 1. The valve cover 22 has an integrally formed hose fitting or outlet tube 26 by which the fuel vapor vent valve device is adapted to be connected by a hose 28 to the vapor storage canister 14. Mounted in the valve body 16 are a spring seat 30, spring 32, float 34, valve 36 and a closure member 38 at the bottom of the valve containing section 18. A liquid inlet opening 39 is provided in the closure member 38 for communicating the interior of the valve body 16 with the liquid fuel as the tank fills for purposes to be discussed.

The spring seat 30 has an annular skirt 30a and an elongated ball socket 40. A ball 42 is provided on the upper end of the float 34 for universally connecting the float 34 to the spring seat 30. The ball 42 is biased to the bottom of the elongated ball socket 40 by the spring 32 which allows the spring seat 30 to move relative to the float 34 in the vertical direction. The float 34 is located within the valve housing 18 and has an outer wall 34a centered in spaced relationship to the inner wall 18a of the valve housing 18. The spring seat 30 carries the valve element 36 as a central upstanding valve element with a tapered conical outer surface 44 aligned with a valve seat 46 on the end of an extension 48 of a vent tube 50 with an annular collar 52 located in sealing engagement with a vapor exit passage 54. In this embodiment of the invention the sealing engagement is provided in part by an annular seal member 56 interposed between the collar 52 and the underside of the cover 22. The vent tube 50 receives fuel vapors from the fuel tank from vapor exit ports 53 formed in the upper end of the valve housing 18 at a point located closely adjacent the upper wall or top 12a of the fuel tank and at a point that is high enough above the valve seat 46 to avoid fuel carry over into the vapor exit passage and thence into the fuel vapor canister 14. As illustrated in FIG. 1, the vent tube 50 locates the valve seat 46 a substantial distance below the top 12a of the fuel tank 12 so that liquid fuel can not flow in a direct linear path through the vapor exits ports 53 and into the vapor exit passage 54 past valve seat 46. In fact, for all practical purposes, liquid fuel cannot even flow in a direct linear path into the extension 48.

The spring 32 rests on the seat 30 and is received at its lower end around the shank portion 42a of the ball 42 at a centrally located point on the upper end of the float 34.

In this embodiment, the float 34 includes a weighted closure disk 58 that will maintain the outer wall 34a of the float 34 in spaced relationship to the inner surface 18a of the valve housing 18.

The underside of the weighted closure disk 58 is configured to have a conical surface or ramp 60 that is supported on a ball 62 that is, in turn, supported by the conical inner surface or ramp 64 of the closure member 38. In the illustrated arrangement, the float and weighted closure disk 58 are heavy enough not to shut off flow at low pressure buildups in the fuel tank 12, but are light enough to float in the fuel during a fuel filling operation in which the fuel level is raised in the fuel tank 12 toward the top 12a thereof. The weight in the weighted closure disk 58 is placed such that the float 34 always floats straight up within the valve housing section 18 thereby to reduce frictional contact between the float 34 and the valve body 16. The angle of ramp of the conical surface 64 is configured such that it will allow the ball 62 to move and shut the float valve when the vehicle tilts greater than a predetermined amount, such as in a range of 30°. The ball 62 also has to be heavy enough to overcome the buoyancy force created by the float 34 in order to close the float valve shut in the event of a vehicle roll over.

In the embodiment of the invention shown in FIG. 1, the bottom closure member 38 includes tabs 38a thereon that are configured to fit into openings 18b on the bottom end of the valve housing section 18. It includes a liquid inlet opening 39 therein to allow for a substantially unrestricted flow of fuel into the interior of the valve housing 18 for causing the float 34 to float in response to liquid fuel flow into the tank 12.

In accordance with certain principles of the present invention, the vapor exit passage 54 is configured to be large enough to vent vapors at the same rate as the rate of fuel flow into the fuel tank during a filling operation. The communication between the vapor exit ports 53 and the inlet end of the vapor tube 48 is selected so that there is no orifice-like restriction therebetween that can produce over pressurization of the tank during filling. The result is that there is substantially no pressure build up in the fuel tank during the refueling operation due to entrapment of vapor. The vapor exit ports 53 are configured and located so that vapor can vent from the tank and out the port or vapor exit passage 54 through an offset flow path defined by the fact that the vent exit ports 53 are located above and laterally of the entrance to the vent tube 50 at the valve seat 46. The vapor exit ports 53 are large enough to cause vapors to flow without restriction during the refueling operation. Furthermore, the vapor exit ports 53 are high enough in the tank so that the liquid droplets that might occur in the tank are not able to flow directly from the vapor exit ports 53 to the valve seat 46 during the refueling operation or during tilting or other jousting of the fuel tank 12 thereby to avoid any fuel carryover to the charcoal canister 14 that can affect its vapor absorbing capacity.

In the embodiment of FIG. 1, the conical configuration of the tapered outer surface 44 is selected to slowly restrict vapor flow during closure of the float valve that would otherwise build up pressure in the fuel tank as the fuel moves the float upwardly during a fuel filling operation. The conical shape is configured so that there is enough pressure build up in the tank to shut the fuel nozzle supplying the tank from the fuel filler pipe even though the float the valve is not completely closed. This allows for some of the vapor to vent and drain the fuel in the filler pipe head as the tank reaches its fuel shut off level. Additionally, the conical part of the valve is spring loaded by the spring 32 to allow the valve element 36 to shift into a centered relationship with the valve seat center 46 for sealing thereacross when the valve is closed.

Additionally, the above-described arrangement avoids a sudden build up of pressure in the tank that might otherwise cause a fuel spit back effect at the fill head. The location of the valve seat 46 is below the vapor exit ports 53 and is located at a height below the top of the fuel tank 12 to provide a desired fuel shut off height that will allow for an assured vapor dome space in the fuel tank that will enable vapor pressure buildup to occur after the float valve is closed.

A second preferred embodiment of the invention is illustrated in FIGS. 2–9. This second preferred embodiment of the invention has further improvements and enhancements that are incorporated in the refueling valve assembly 100 as explained below.

Figure 3:
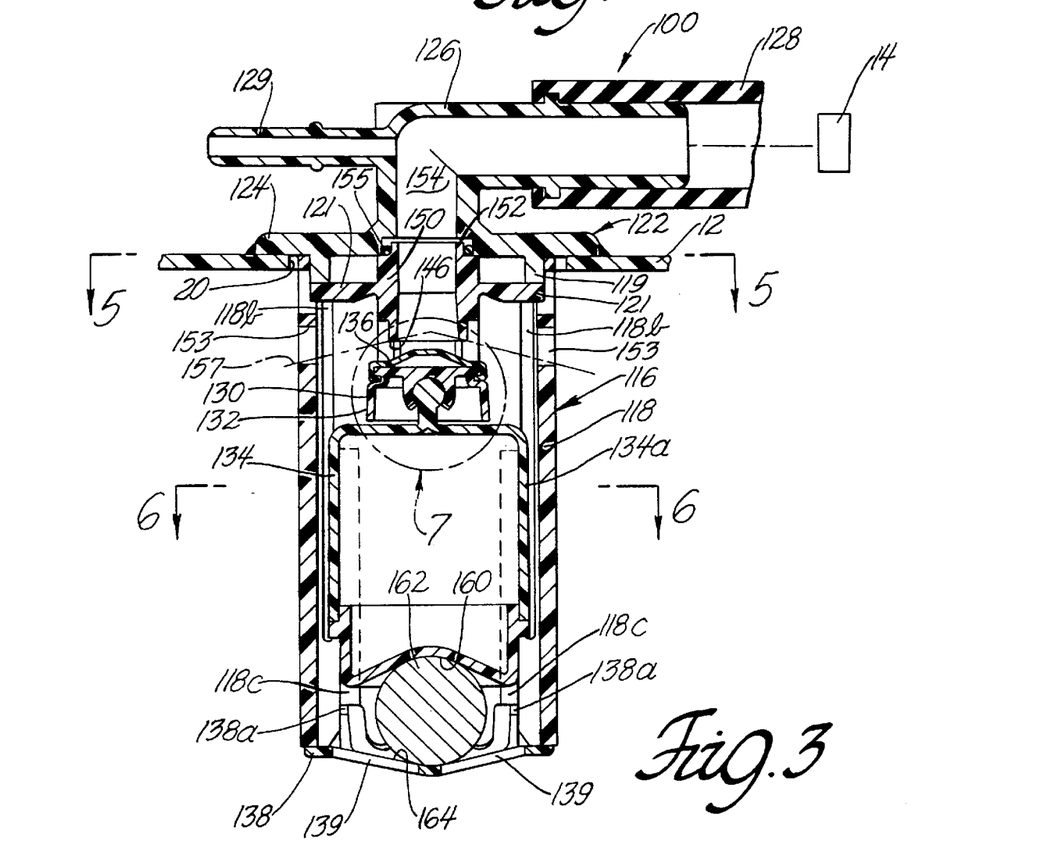
FIG. 3 is a sectional view taken substantially along the line 3—3 of FIG. 2 looking in the direction of the arrows.
Figure 4:
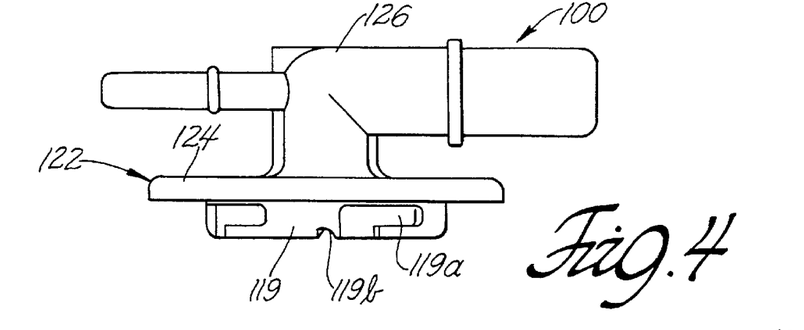
FIG. 4 is a sectional view taken substantially along the line 4—4 of FIG. 2 looking in the direction of the arrows.

Refueling valve assembly 100 comprises body 116 that includes a generally cylindrical valve containing section 118. Section 118 has lugs 118a (FIG. 5) at the upper end that extend radially inwardly for connection to a cylindrical extension 119 of cover 122 received in an opening 20 through the top wall of fuel tank 12 as explained in detail below. Cover 122 is also made of a high-density polyethylene (HDPE), this material being selected for its ability to weld to the fuel tank 12. Thus cover 122 can be welded about the perimeter of flange 124 to the fuel tank vertically oriented or upright position as shown in FIG. 3. The valve cover 122 has an integrally formed hose fitting or outlet tube 126 by which the fuel vapor vent valve device is adapted to be connected by a hose 128 to the vapor storage canister 14. A smaller inlet tube 129 at the back end of outlet tube 126 provides for connecting a rollover or vent valve such as the valve shown in U.S. Pat. No. 5,413,137, cited above, in series with the refueling valve assembly 100. Inlet tube 129 is eliminated or closed off in the absence of such a valve.

Mounted in the valve body 116 are seat 130, float 134, valve 136 and a closure member 138 at the bottom of the valve containing section 118. Liquid inlet slots or opening 139 are provided in the closure member 138 for communicating the interior of the valve body 116 with the liquid fuel as the tank fills for purposes to be discussed.

Figures 5, 6, 7:
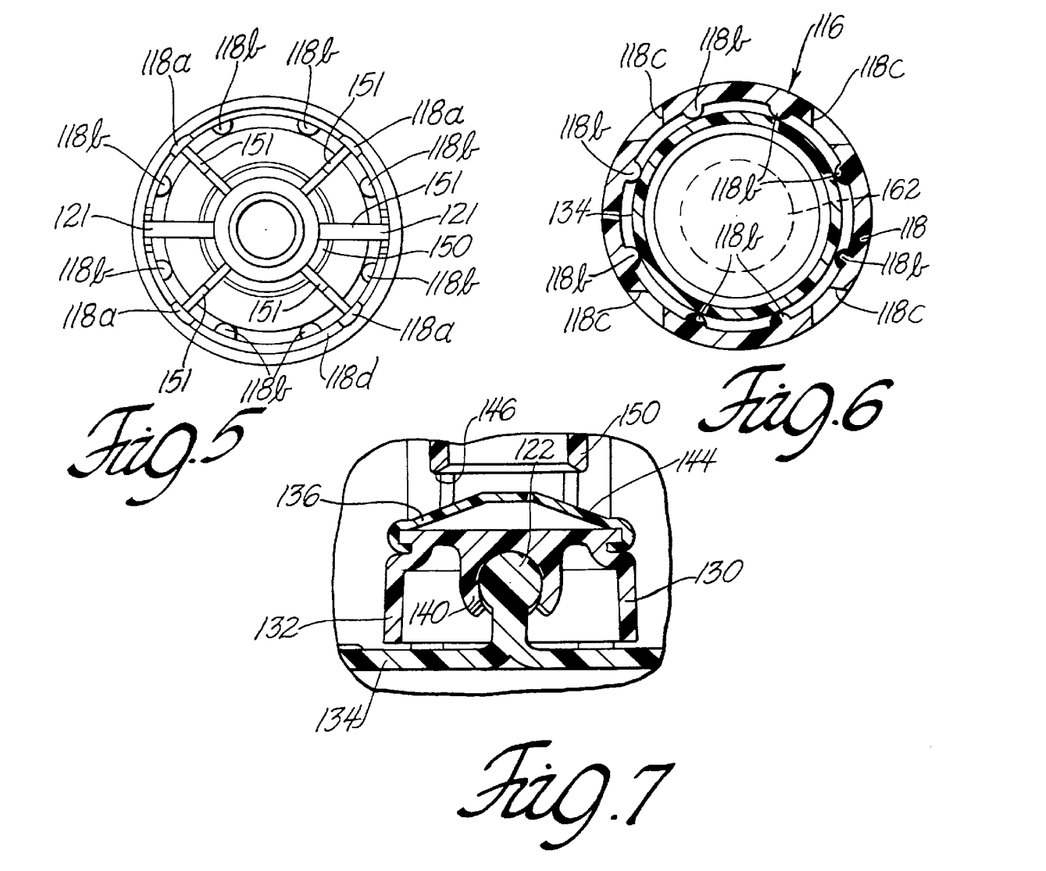
FIG. 5 is a sectional view taken substantially along the line 5—5 of FIG. 3 looking in the direction of the arrows.
FIG. 6 is a sectional view taken substantially along the line 6—6 of FIG. 3 looking in the direction of the arrows.
FIG. 7 is an enlargement of a portion of FIG. 3.

Seat 130 has an annular skirt 132 and a ball socket 140, as best shown in FIG. 7. A ball 142 is provided on the upper end of the float 134 for universally connecting the seat 130 to the float 134. The ball socket 140 preferably conforms closely to the ball 142 so that the seat 130 pivots freely relative to the float with little or no movement in the vertical direction. The float 134 is located within the valve housing 116 and has an outer wall 134a centered in spaced relationship to the inner wall of the valve section 118 by a plurality of circumferentially spaced, internal, vertical ribs 118b of the valve section 118. Vertical ribs 118b align float 134 centrally in valve housing 116 which minimizes the tilt of float 134 and increases sealing ability. Ribs 118b which have convex surfaces for engaging float 134 as shown in FIGS. 5 and 6, also reduce friction between float 134 and valve section 118.

Valve section 118 also has a plurality of circumferentially spaced, vertical slots 118c through the wall of valve section 118 that are used to attach the closure member 138 and enhance float response. Slots 118c commence near the lower end of valve section 118 and extend upwardly to a point just below the top of float 134 when float 134 is bottomed out on ball 162.

The valve 136 is made of a flexible elastomer and is circular in shape. Valve 136 includes a U-shaped rim for attachment to seat 130 and a conical surface 144 aligned with a matching conical valve seat 146 on the lower end of a vent tube 150. The flexibility of the elastomeric valve 136 and the matching conical shapes of surface 144 and valve seat 146 enhance valve performance. Sealing ability is improved by an increased contact area when valve 136 is closed and head loss of the fuel vapor flowing past valve 136 when valve 136 is open is reduced.

Vent tube 150 is preferably an integral part of body 116 and connected to the upper end of section 118 by four radial fins 151. Vent tube 150 has an annular collar 152 at the upper end that is located in sealing engagement with a vapor exit passage 154 in cover 122 when body 116 is attached to cover 122.

Accurate location of vent tube 150 by radial fins 151 and a strong coupling arrangement for attaching body 116 to cover 122 provides excellent sealing engagement that may be enhanced by an annular seal member 155 between the collar 152 and the cover 133.

The coupling arrangement is a bayonet slot type coupling comprising lugs 118a at the upper end of valve body section 118 and a plurality of L-shaped slots 119a in the outer surface of cover extension 119. Cover extension 119 slides into the upper end of valve body 118 against shoulder 118d with lugs 118a aligned with the axial, open-ended portions of the L-shaped slots 119a. Cover 122 is then rotated or indexed with respect to valve body 116 until lugs 118b bottom out in the circumferential closed-ended portions of the L-shaped slots 119a. This locks the cover 122 to valve body 116 in the axial and radial direction and in one circumferential direction. Cover 122 is locked to valve body 116 in the opposite circumferential direction by resilient lock fingers 121 that extend radially outwardly from vent tube 150 in cantilever fashion and engage notches 119b in the bottom of cover extension 119. Resilient fingers 121 are stressed while assembling cover 122 to valve body 116 but are preferably in an unstressed state when engaged in notches 19b. The several resilient fingers 121 must be depressed simultaneously in order to rotate cover 122 and position lugs 118a in the axial open ended portions of slots 119a to detach the cover from valve body 116.

The vent tube 150 receives fuel vapors from the fuel tank from vapor exit ports 153 formed in the upper end of the valve housing 118 at a point located closely adjacent the upper wall or top 12a of the fuel tank and at a point that is high enough above the valve seat 146 to avoid fuel carry over into the vapor exit passage and thence into the fuel vapor canister 14.

In this embodiment, approximately half of vapor exit ports 153 are above valve seat 146. However, vent tube 150 still locates the valve seat 146 a substantial distance below the top 12a of fuel tank 12 so that liquid fuel cannot flow in a direct linear path through vapor exit ports 153 into vapor exit passage 154 past valve seat 146. In fact liquid fuel can hardly flow directly into vent tube 150 as indicated by the imaginary lines 157 in FIG. 3.

In this embodiment, the float 134 is guided very accurately by the ribs 118b that maintain the outer wall 134a of the float 34 in a closely spaced relationship to the valve housing section 118.

The underside of the float 134 is configured to have a conical surface or ramp 160 that is supported on a ball 162 that is, in turn, supported by a conical inner surface or ramp 164 of the closure member 138. Ramp 160 preferably has a radius of curvature that is larger than the radius of ball 162 to increase the responsiveness of the float 134 by allowing the float 134 to move out of the static position easily when the refueling valve assembly 100 is tilted or subjected to a minor horizontal force.

In the illustrated arrangement, the float 134 is heavy enough not to shut off flow at low pressure buildups in the fuel tank 12, but is light enough to float in the fuel during a fuel filling operation in which the fuel level is raised in the fuel tank 12 toward the top 12a of fuel tank 12. Ribs 118b are placed such that the float 134 always floats straight up within the valve housing section 118 thereby to reduce frictional contact between the float 134 and the valve body 116. The angle of ramp of the conical surface 164 is configured such that it will allow the ball 162 to move and shut the float valve when the vehicle tilts greater than a predetermined amount, such as in a range of 30°. The ball 162 is also heavy enough to close the float valve shut by overcoming the buoyancy force created by the float 134 if the vehicle rolls over and the fuel tank 12 is inverted.

In the embodiment of the invention shown in FIGS. 2–9, the bottom closure member 138 includes tabs 138a that are configured to fit into slots 118c. Closure member 138 includes liquid inlet slots 139 to allow for a substantially unrestricted flow of fuel into the interior of the valve housing 118 for causing the float 134 to float in response to liquid fuel flow into the tank 12.

Slots 118c commence near the lower end of valve housing section 118 for receiving tabs 138a and also extend upwardly to a level just below the top of float 134 when the float 134 is bottomed out on ball 162. This elongation improves the response of the float 134 to the rising fuel level in fuel tank 12 during the fill procedure and during dynamic fuel sloshing due to vehicle operation. Moreover, the limited height of slots 118c inhibits liquid fuel splash into passage 154 through open valve 146.

Vapor exit passage 154 is large enough to vent vapors at the same rate as the rate of fuel flow into the fuel tank during a filling operation. The communication between the vapor exit ports 153 and the inlet end of the vapor tube 150 is selected so that there is no orifice-like restriction therebetween that can produce over pressurization of the tank during filling. The result is that there is substantially no pressure build up in the fuel tank during the refueling operation due to entrapment of vapor. The vapor exit ports 153 are configured and located so that vapor vents from tank 12 out the vapor exit passage 154 through an offset flow path defined by the vent exit ports 153 are located above and laterally of the entrance to the vent tube 150 at the valve seat 146. The vapor exit ports 153 are large enough to cause vapors to flow without restriction during the refueling operation. Furthermore, the vapor exit ports 153 are high enough in the tank so that the liquid droplets that might occur in the tank are not able to flow directly from the vapor exit ports 153 to the valve seat 146 during the refueling operation or during tilting or other jousting of the fuel tank 12 thereby to avoid any fuel carryover to the charcoal canister 14 that can affect its vapor absorbing capacity.

In the embodiment of FIGS. 2–9, the conical configuration of the tapered outer surface 144 is selected to slowly restrict vapor flow during closure of the float valve that would otherwise build up pressure in the fuel tank as the fuel moves the float upwardly during a fuel filing operation. The conical shape is configured so that there is enough pressure build up in the tank to shut the fuel nozzle supplying the tank from the fuel filler pipe off even though the float valve is not completely closed. This allows for some of the vapor to vent and drain the fuel in the filler pipe head as the tank reaches its fuel shut off level. Additionally, the conical part of the valve is loaded by the resistance of the material to allow the valve element 136 to shift into a centered relationship with the valve seat center 146 for sealing thereacross when the valve is closed.

Additionally, the above-described arrangement avoids a sudden build up of pressure in the tank that might otherwise cause a fuel spit back effect at the fill head.

The valve seat 146 is at the median level of the vapor exit ports 153 and is located at a height below the top of the fuel tank 12 to provide a desired fuel shut off height that will allow for an assured vapor dome space in the fuel tank that will enable vapor pressure buildup to occur after the float valve is closed.

Figure 8:
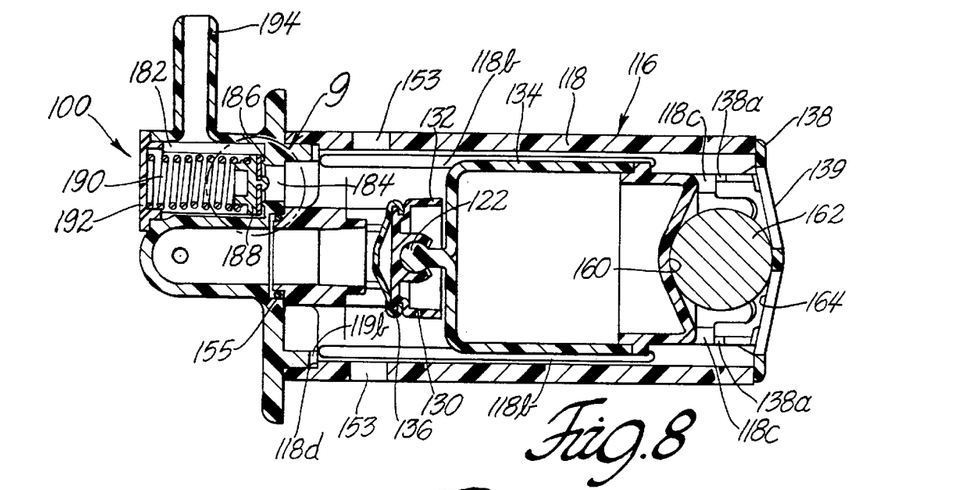
FIG. 8 is a sectional view taken substantially along the line 8—8 of FIG. 2 looking in the direction of the arrows.

The refueling valve assembly 100 also includes a pressure relief valve indicated generally at 180 to vent the fuel tank 12 under high pressure conditions.

Figures 9, 10:
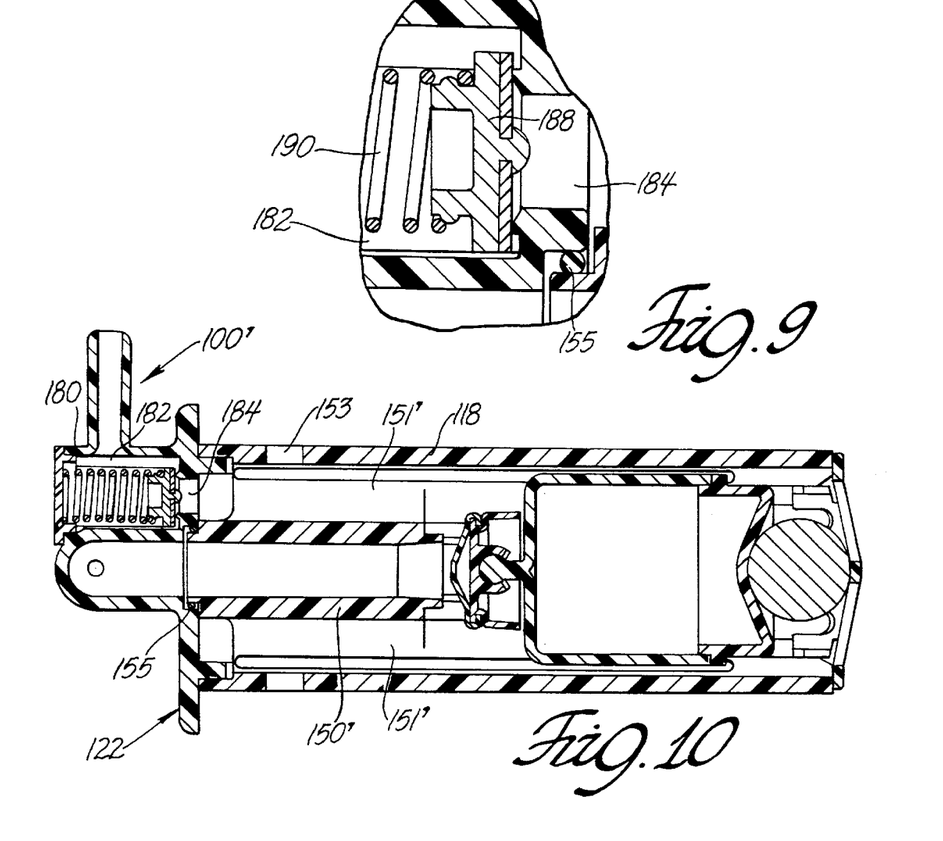
FIG. 9 is an enlargement of a portion of FIG. 8.
FIG. 10 is a sectional view of a modification of the vent valve assembly that is shown in FIGS. 2–9.

Pressure relief valve 180 comprises a valve chamber 182 formed as an integral part of cover 122. Valve chamber 182 communicates with the interior of tank 12 via opening 184 in cover 122 the interior of valve body section 118 and vapor exit ports 153. Opening 184 has a valve seat 186 inside chamber 182 that is closed by valve member 188 under the action of compression spring 190 disposed in chamber 182. Spring 190 reacts against cap 192 at the top of valve chamber 182. Valve chamber 182 has an exit pipe 194 that can be vented to atmosphere or connected to the fuel tank filler pipe by suitable hoses or conduit (not shown). Valve member 188 carries a thin elastomer seal 189 that mates flatly with the undersurface of valve member 188. This arrangement reduces compression set of the elastomer seal for improved performance after repeated high pressure opening of pressure relief valve 180.

A modification of the second embodiment is shown in FIG. 10. Refueling valve 100' is considerably longer than refueling valve 100 and includes a deeper vent tube 150' that is attached by four vertical fins 151'. The height of the vertical fins 151' is increased to maintain the accurate location of the deeper vent tube 150'. The parts of refueling valve 100' are otherwise the same as refueling valve 100 and corresponding parts are identified by the same numerals.

While the invention has been illustrated in connection with a refueling valve, it should be understood that the invention may have advantages in connection with other types of valves particularly valves that are used to vent fuel tanks.

Obviously, many modifications and variations of the present invention in light of the above teachings may be made. It is, therefore, to be understood that, within the scope of the appended claims, the invention may be practiced otherwise than as specifically described.

What is claimed is:

1. A fuel vapor vent valve adapted to be mounted in the top of a motor vehicle fuel tank, said valve comprising, a body having an inlet passage adapted to be open to liquid fuel and fuel vapor and a cover adapted to be connected to the top of a fuel tank and having a vapor exit passage adapted to be connected to a fuel vapor storage device, the body being connected to the cover and adapted to be disposed in the fuel tank in depending relationship with the cover; and a valve including a float and a valving element carried by the float and tiltable with respect to the float for compensating for tilt further characterized by:

said body further including a vapor exit port located above said inlet;

a vent tube supported within said body having one end sealingly connected to the vapor exit passage and having an opposite end defining a valve seat closable by the valving element and located with respect to the vapor exit port for separating liquid fuel particles prior to entering said vapor exit passage, the vent tube being an integral part of said body, and the vent tube being connected to said body by a plurality of circumferentially spaced fins for accurately locating said valve seat concentrically at a distance from the upper wall of the fuel tank that will provide for a predetermined vapor dome space within said tank to accommodate vapor pressure increases when the valve is closed by the valving element.

2. The valve of claim 1 further characterized in that the body has a plurality of internal vertical ribs in a side wall of the body having convex surfaces for guiding the float in the body.

3. The valve of claim 1 further characterized by a high pressure relief valve comprising a valve chamber that is formed as an integral part of the cover and that communicates with the interior of the fuel tank via an opening in the cover, the opening having a valve seat inside that valve chamber that is closed by a valve member under the action of a compression spring disposed in the valve chamber.

4. A fuel vapor vent valve adapted to be mounted in the top of a motor vehicle fuel tank, said valve comprising a body having an inlet passage adapted to be open to liquid fuel and fuel vapor and a separate cover adapted to be connected to the top of a fuel tank and having a vapor exit passage adapted to be connected to a fuel vapor storage device, the body being connected to the separate cover and adapted to be disposed in the fuel tank in depending relationship with the cover; and a valve including a float and a valving element carried by the float and tiltable with respect to the float for compensating for tilt further characterized by:

said body further including a vapor exit port located above said inlet;

a vent tube supported within said body having one end sealingly connected to the vapor exit passage and having an opposite end defining a valve seat closable by the valving element and located in the fuel tank with respect to the vapor exit port for separating liquid fuel particles prior to entering said vapor exit passage, and the vent tube being an integral part of said body, the valve seat being located at or below a median level of the vapor exit port.

5. The valve of claim 4 further characterized by the valve body having a plurality of vapor exit ports and the valve seat is located at or below a median level of all vapor exit ports.

6. A fuel vapor vent valve adapted to be mounted in the top of a motor vehicle fuel tank, said valve comprising a body having an inlet passage adapted to be open to liquid fuel and fuel vapor and a separate cover adapted to be connected to the top of a fuel tank and having a vapor exit passage adapted to be connected to a fuel vapor storage device, the body being connected to the separate cover and adapted to be disposed in the fuel tank in depending relationship with the cover; and a valve including a float and a valving element carried by the float and tiltable with respect to the float for compensating for tilt further characterized by:

said body further including a vapor exit port located above said inlet;

a vent tube supported within said body having one end sealingly connected to the vapor exit passage and having an opposite end defining a valve seat closable by the valving element and located with respect to the vapor exit port for separating liquid fuel particles prior to entering said vapor exit passage, the vent tube being an integral part of said body, and further characterized in that the inlet passage includes a plurality of vertical slots in a side wall of the body that commence near the bottom of the side wall and extend up approximately the top of the float when the float is bottomed out in the body.

7. The valve of claim 6 further characterized in that the body has a plurality of internal vertical ribs in the side wall of the body having convex surfaces for guiding the float in the body.

8. A fuel vapor vent valve adapted to be mounted in the top of a motor vehicle fuel tank, said valve comprising a body having an inlet passage adapted to be open to liquid fuel and fuel vapor and a separate cover adapted to be connected to the top of a fuel tank and having a vapor exit passage adapted to be connected to a fuel vapor storage device, the body being connected to the separate cover and adapted to be disposed in the fuel tank in depending relationship with the cover; and a valve including a float and a valving element carried by the float and tiltable with respect to the float for compensating for tilt further characterized by:

said body further including a vapor exit port located above said inlet;

a vent tube supported within said body having one end sealingly connected to the vapor exit passage and having an opposite end defining a valve seat closable by the valving element and located with respect to the vapor exit port for separating liquid fuel particles prior to entering said vapor exit passage, the vent tube being an integral part of said body, and the valving element being a flexible elastomer that is mounted on a seat that is connected to the float by a ball joint for adjusting the position of the valving element with respect to the annular valve seat to compensate for tilt and that has a conical portion for engaging the annular valve seat that is spaced from the seat that is connected to the float, the seat having a skirt juxtaposed the float for limiting tilt of the seat.

9. The refueling valve of claim 8 wherein the vent tube has a conical valve seat and the conical portion of the flexible elastomer has a conical surface that matches and is aligned with the conical valve seat.

10. A fuel vapor vent valve adapted to be mounted in the top of a motor vehicle fuel tank, the valve comprising a body having an inlet passage adapted to be open to liquid fuel and fuel vapor and a cover adapted to be connected to the top of a fuel tank and having a vapor exit passage adapted to be connected to a fuel vapor storage device, the body being connected to the cover and adapted to be disposed in the fuel tank in depending relationship with the cover; and a valve including a float and a valving element carried by the float and tiltable with respect to the float for compensating for tilt further characterized by:

the body further including a vapor exit port located above the inlet;

a vent tube supported within the body having one end sealingly connected to the vapor exit passage and having an opposite end defining a valve seat closable by the valving element and located with respect to the vapor exit port for separating liquid fuel particles prior to entering the vapor exit passage, the vent tube being an integral part of the body and connected to the body by a plurality of circumferentially spaced fins for accurately locating the valve seat concentrically at a distance from the upper wall of the fuel tank that will provide for a predetermined vapor dome space within said tank to accommodate vapor pressure increases when the valve is closed by the valving element, the inlet passage including a plurality of vertical slots in a side wall of the body that commence near the bottom of the side wall and extend up approximately to the top of the float when the float is bottomed out in the body, the body having a plurality of internal vertical ribs in a side wall of the body for guiding the float in the body, and the valving element being a flexible elastomer that is mounted on a seat that is connected to the float by a ball joint for adjusting the position of the valving element with respect to the annular valve seat to compensate for tilt.

11. The fuel vapor vent valve of claim 10 wherein the vent tube has a conical valve seat and the flexible elastomer has a conical surface that matches and is aligned with the conical valve seat.

* * * * *